United States Patent
Steiner et al.

[11] Patent Number: 6,148,786
[45] Date of Patent: Nov. 21, 2000

[54] MOUNTING DEVICE FOR AN ENGINE BEARING OF AN INTERNAL COMBUSTION ENGINE

[75] Inventors: Bernd Steiner, Cologne; Walter Wolfgang Robert Blume, Kerpen, both of Germany

[73] Assignee: Ford Global Technologies, Inc., Dearborn, Mich.

[21] Appl. No.: 09/254,557

[22] PCT Filed: Sep. 1, 1997

[86] PCT No.: PCT/EP97/04737

§ 371 Date: Mar. 10, 1999

§ 102(e) Date: Mar. 10, 1999

[87] PCT Pub. No.: WO98/10950

PCT Pub. Date: Mar. 19, 1998

[30] Foreign Application Priority Data

Nov. 9, 1996 [DE] Germany .................... 196 36 820

[51] Int. Cl.[7] ....................................... F02F 7/00
[52] U.S. Cl. ........................................ 123/195 A
[58] Field of Search ........................... 123/195 A

[56] References Cited

U.S. PATENT DOCUMENTS

| 5,125,376 | 6/1992 | Williams et al. | 123/195 A |
| 5,743,229 | 4/1998 | Hosoya | 123/195 A |
| 5,887,560 | 3/1999 | Kobayashi | 123/195 A |
| 5,908,017 | 6/1999 | Kaneko | 123/195 A |

Primary Examiner—John Kwon
Attorney, Agent, or Firm—Jerome R. Drouillard

[57] ABSTRACT

In a device for mounting an engine bearing of an internal combustion engine, a bracket is provided for attachment to an end face of a cylinder head of the internal combustion engine. The bracket includes a contact area to rest against the end face of the cylinder head, and further includes an angular component with a first arm as the mounting for the engine bearing and a second arm, formed integrally therewith, as an auxiliary unit carrier, thereby forming an engine bearing console with an integrated auxiliary unit carrier. In a further embodiment an eyelet-shaped engine lifting device is formed integrally therewith, preferably in the vicinity of the auxiliary unit carrier. Similarly, a mounting point for securing a guide pulley for the auxiliary unit may be integrated in a thickened front region of the component.

20 Claims, 2 Drawing Sheets

MOUNTING DEVICE FOR AN ENGINE BEARING OF AN INTERNAL COMBUSTION ENGINE

FIELD OF THE INVENTION

The invention relates to a device for mounting an engine bearing of an internal combustion engine including a device part intended for attachment to an end face of a cylinder head of the internal combustion engine and having a contact area to rest against the end face of the cylinder head.

BACKGROUND OF THE INVENTION AND PRIOR ART

It is known to secure bracket for mounting an engine bearing to the end face of the cylinder head by means of screws. For attachment of an auxiliary unit (e.g. a generator) it is further known to screw on to this bracket a separate auxiliary unit carrier, which is then itself screwed on to the end face of the cylinder head.

OBJECT OF THE INVENTION

The object of the invention is to reduce the number of individual parts and the cost of assembly.

SUMMARY OF THE INVENTION

With this object in view, in accordance with the invention an angular bracket has a first arm provided thereon for mounting an engine bearing. The first arm includes a first contact area for mounting to the cylinder head on an end thereof. A second arm, preferably formed integrally with the bracket, acts as an auxiliary unit carrier and is provided with a second contact area running transverse to the first contact area of the first arm to rest against one of the side faces of the cylinder head which adjoin the end face of the cylinder head.

By forming the bracket as a single component is advantageous because the use of the device in accordance with the invention enables the assembly to be effected in a single step instead of successive assembly steps, first to attach the bracket for mounting an engine bearing and then to attach the auxiliary unit carrier.

In a particularly advantageous embodiment of the invention the component in accordance with the invention includes, in the vicinity if the auxiliary unit carrier and formed integrally. therewith, an eyelet-shaped engine lifting device (a so-called lifting eye). This lifting eye serves in a known manner for removal or replacement of the internal combustion engine by means of a lifting device.

In a further embodiment of the invention, the bracket is in the form of an aluminium pressure die casting. In an alternative embodiment, the bracket is made from a plastic material.

BRIEF DESCRIPTION OF THE DRAWINGS

The invention will now be described in more detail with reference to an exemplary embodiment shown diagrammatically in the drawings, in which.

DETAILED DESCRIPTION OF PREFERRED EMBODIMENTS OF THE INVENTION

Figure 1:
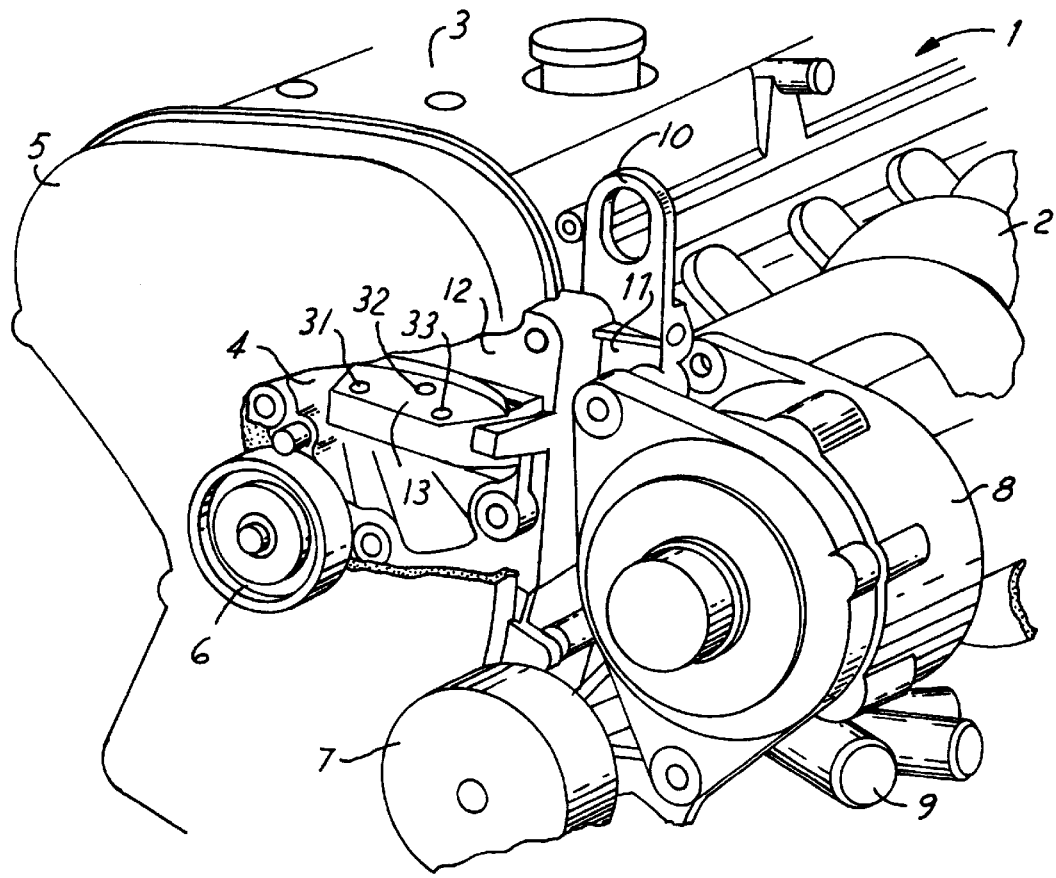
FIG. 1 is a diagrammatic partial perspective view of an internal combustion engine having a component in accordance with the invention.

An internal combustion engine 1 shown diagrammatically in FIG. 1 includes an intake manifold 2, a valve gear cover 3 and an end face of the cylinder head, denoted by 4, which is covered by a cap 5. A guide pulley for an auxiliary unit bears the reference numeral 6 and a water pump belt pulley bears the reference numeral 7. A generator (commonly referred to as an alternator) is indicated by 8, and a water inlet/thermostat housing bears the reference numeral 9. An eyelet-shaped engine lifting device (so-called lifting eye) is indicated by 10.

The generator 8 is attached to an auxiliary unit carrier 11. A bracket 12 is mounted to the end face 4 of the cylinder head. The bracket 12 is screwed to the cylinder head and includes a provision for mounting an engine bearing. The bracket 12 includes a console-shaped thickening 13.

Figure 2:
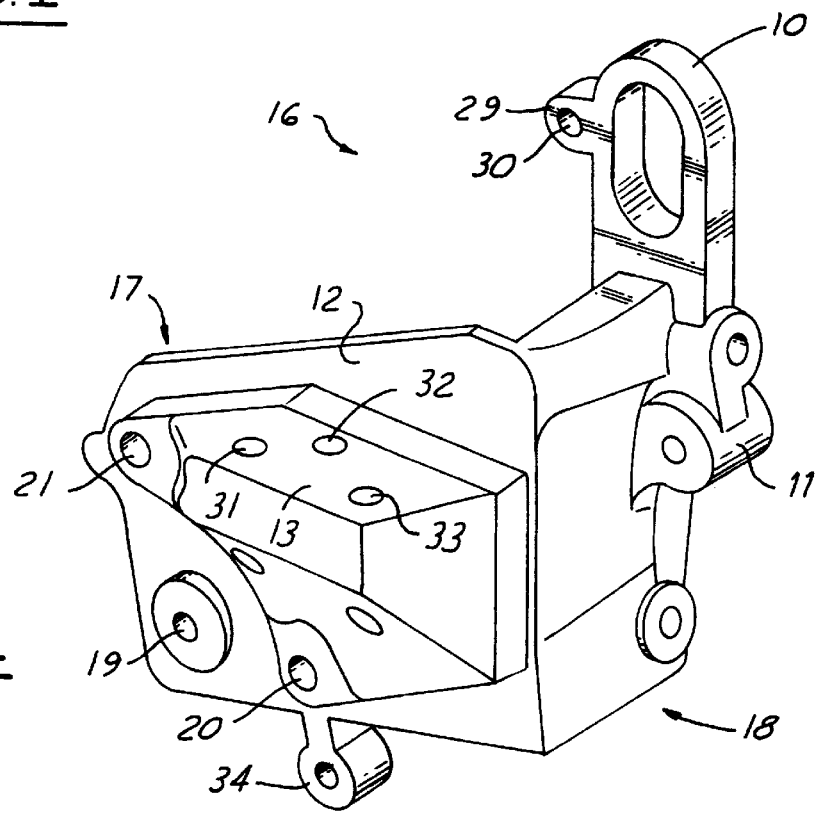
FIG. 2 is a diagrammatic perspective view of the component in accordance with the invention on a larger scale than that of FIG. 1.
Figure 3:
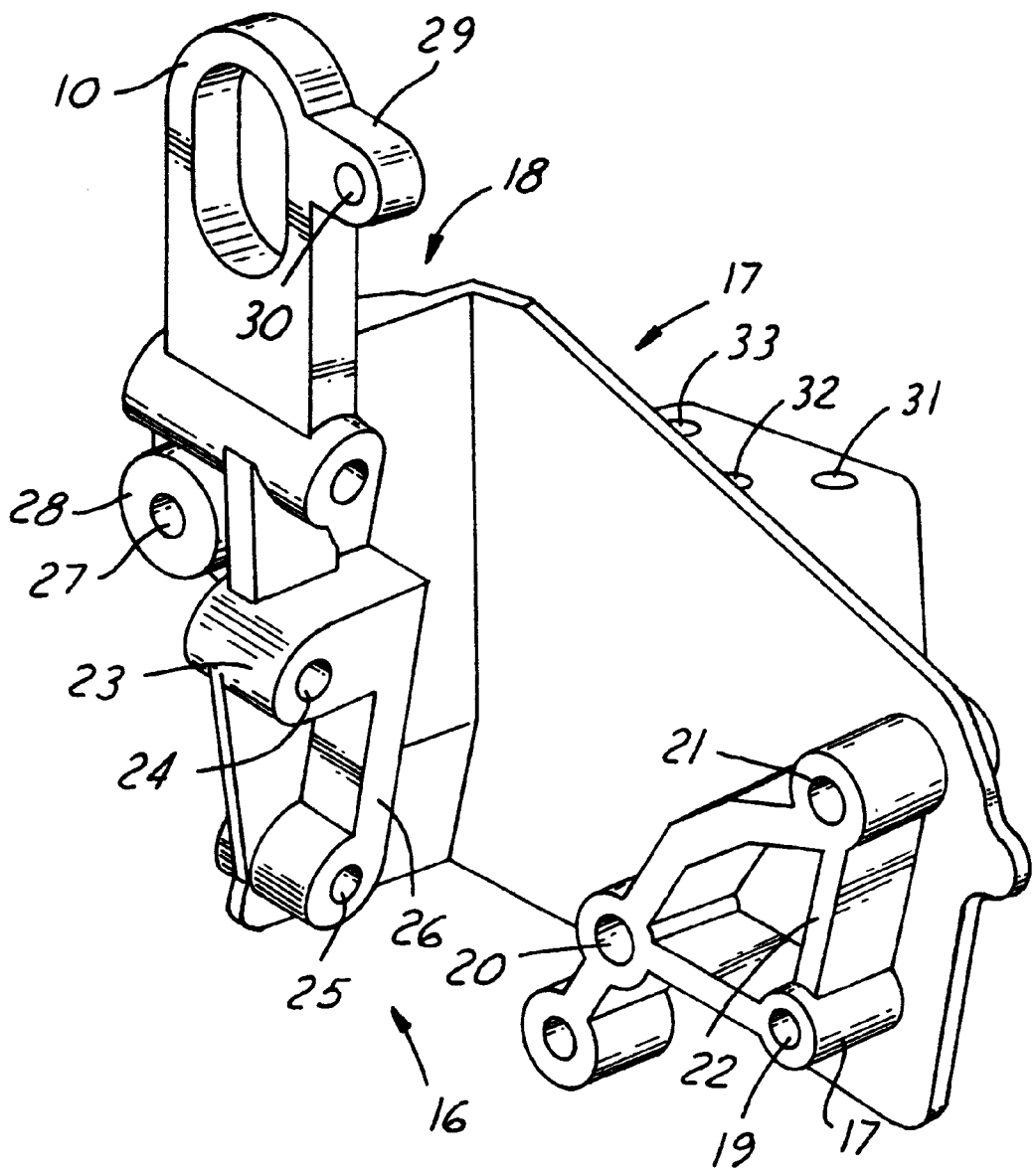
FIG. 3 is a view of the component of FIG. 2, seen from the opposite side.

As can be more clearly seen from FIG. 2 and FIG. 3, the bracket 12, the auxiliary unit carrier 11 and the eyelet-shaped engine lifting device 10 form constituent parts of an angular component 16 having arms 17 and 18. The angular component 16 is preferably an aluminium pressure die casting and includes thickened regions with screw holes 19 to 21. The first arm 17 has a flat contact area which rests against the end face 4 of the cylinder head. A further thickened region 23 has screw holes 24 and 25. A contact area 26 is provided to rest against the side face of the cylinder head adjacent to the end face 4. Beneath the eyelet-shaped engine lifting device 10 there is a thickening 28 provided with screw holes 27, to which the auxiliary device (e.g., the generator 8) can be screwed. The eyelet-shaped engine lifting device 10 includes a side extension part 29 with a screw hole 30. The console-like thickening 13 has mounting holes 31, 32 and 33 to receive stay bolts (not shown).

While the best modes for carrying out the invention have been described in detail, those skilled in the art in which this invention relates will recognise various alternative designs and embodiments, including those mentioned above, in practicing the invention that have been defined by the following claims.

What is claimed is:

1. A bracket for mounting an engine bearing of an internal combustion engine comprising:

a first arm for attachment to an end face of a cylinder head of the internal combustion engine, the first arm having a contact area to rest against the end face of the cylinder head, the first arm supporting an engine bearing; and a second arm attached to the first arm for supporting an auxiliary unit, the second arm having a second contact area, extending transverse to the contact area of the first arm the second surface resting against a side face of the cylinder head adjoining the end face of the cylinder head.

2. A bracket according to claim 1, further comprising an eyelet-shaped engine lifting device attached to one of the first and second arms.

3. A bracket according to claim 1 further comprising a mounting point for securing a guide pulley for an auxiliary unit drive.

4. A bracket according to claim 1, further comprising an aluminium pressure die casting.

5. A bracket according to claim 1, wherein the bracket comprises a plastic part.

6. A bracket according to claim 1, wherein the first and second arms are integrally formed in said bracket as a unitary part.

7. A bracket according to claim 2, wherein the eyelet, first arm and second arm are integrally formed in said bracket as a unitary part.

8. A bracket according to claim 3, wherein the mounting point, first arm and second arm are integrally formed in said bracket as a unitary part.

9. A bracket according to claim 4, wherein the first and second arms are integrally formed in said bracket as a unitary part.

10. A bracket according to claim 5, wherein the first and second arms are integrally formed in said bracket as a unitary part.

11. A device according to claim 2, wherein the bracket further comprises a mounting point for securing a guide pulley for an auxiliary unit drive.

12. A bracket according to claim 11, wherein the eyelet, mounting point, first arm and second arm are integrally formed in said bracket as a unitary part.

13. A device according to claim 6, wherein the bracket further comprises an aluminium pressure die casting.

14. A device according to claim 7, wherein the bracket further comprises an aluminium pressure die casting.

15. A device according to claim 8, wherein the bracket further comprises an aluminium pressure die casting.

16. A device according to claim 9, wherein the bracket further comprises an aluminium pressure die casting.

17. A device according to claim 10, wherein the bracket further comprises an aluminium pressure die casting.

18. A device according to claim 12, wherein the bracket further comprises an aluminium pressure die casting.

19. A device according to claim 6, wherein the bracket comprises a plastic part.

20. A device according to claim 7, wherein the bracket comprises a plastic part.

* * * * *